(12) United States Patent
Phillips

(10) Patent No.: US 6,834,357 B2
(45) Date of Patent: Dec. 21, 2004

(54) ESTABLISHING A POINTER AT A VALID ADDRESS LOCATION THAT IS REPRESENTATIVE OF A VALID ENTRY POINT OF A COMMUNICATION ROUTINE

(75) Inventor: Mark Phillips, Bristol (GB)

(73) Assignee: STMicroelectronics Limited, Almondsbury Bristol (GB)

( * ) Notice: Subject to any disclaimer, the term of this patent is extended or adjusted under 35 U.S.C. 154(b) by 629 days.

(21) Appl. No.: 09/778,581

(22) Filed: Feb. 7, 2001

(65) Prior Publication Data

US 2001/0034800 A1 Oct. 25, 2001

(30) Foreign Application Priority Data

Apr. 20, 2000 (GB) .............................................. 0009939

(51) Int. Cl.[7] ................................................ G06F 11/00
(52) U.S. Cl. ............................... 714/5; 717/126; 714/1; 714/4
(58) Field of Search ............................ 714/5, 6, 30, 35, 714/726, 729, 747, 791, 38, 25, 27, 43, 4; 717/130, 162, 124, 177, 178, 171, 126, 127, 173; 719/331; 709/227; 710/269; 712/35, 222, 224

(56) References Cited

U.S. PATENT DOCUMENTS

| 5,375,207 | A | * | 12/1994 | Blakely et al. ............. 709/203 |
|---|---|---|---|---|
| 5,394,544 | A | | 2/1995 | Motoyama et al. ........... 714/31 |
| 5,548,723 | A | * | 8/1996 | Pettus ......................... 709/228 |
| 5,561,766 | A | | 10/1996 | Kitamori ..................... 714/43 |
| 5,628,016 | A | | 5/1997 | Kukol |
| 5,715,387 | A | | 2/1998 | Barnstijn et al. |
| 5,901,225 | A | | 5/1999 | Ireton et al. |
| 5,925,095 | A | * | 7/1999 | High et al. ..................... 707/2 |
| 6,006,278 | A | * | 12/1999 | Cottrill ....................... 709/330 |
| 6,023,698 | A | * | 2/2000 | Lavey et al. .................. 707/10 |
| 6,031,992 | A | * | 2/2000 | Cmelik et al. .............. 717/138 |
| 6,154,878 | A | * | 11/2000 | Saboff ........................ 717/173 |
| 6,173,421 | B1 | * | 1/2001 | Weaver Johnson et al. ... 714/38 |
| 6,223,217 | B1 | * | 4/2001 | Pettus ......................... 709/219 |
| 6,301,707 | B1 | * | 10/2001 | Carroll et al. .............. 717/177 |
| 6,311,326 | B1 | * | 10/2001 | Shagam ...................... 717/128 |
| 6,314,530 | B1 | * | 11/2001 | Mann ........................... 714/38 |
| 6,356,960 | B1 | * | 3/2002 | Jones et al. .................... 710/5 |
| 6,360,266 | B1 | * | 3/2002 | Pettus ......................... 709/227 |
| 6,442,752 | B1 | * | 8/2002 | Jennings et al. ............ 717/162 |
| 6,493,871 | B1 | * | 12/2002 | McGuirre et al. .......... 717/173 |

OTHER PUBLICATIONS

European Standard Search Report from GB 0009939, filed Apr. 20, 2000.
European Standard Search Report from Great Britian application No. 0009941, filed Apr. 20, 2000.
European Standard Search Report from Great Britain application No. 0009940, filed Apr. 20, 2000.
European Standard Search Report from Great Britain application No. 0009943, filed Apr. 20, 2000.
European Standard Search Report from Great Britain application No. 0009945, filed Apr. 20, 2000.

* cited by examiner

Primary Examiner—Robert Beausoliel
Assistant Examiner—Christopher S. McCarthy
(74) Attorney, Agent, or Firm—Lisa K. Jorgenson; James H. Morris; Wolf, Greenfield & Sacks, P.C.

(57) ABSTRACT

An application program runs on an embedded processor connected via a link to a host. When the application program identifies a need for communication over said link, it reads a pointer location to see whether its contents represent a valid address in memory, and if so the program calls that address. It then checks the code at the address to see whether an entry point is stored there, and if so uses that entry point to access a subroutine enabling communication over the link.

20 Claims, 4 Drawing Sheets

ESTABLISHING A POINTER AT A VALID ADDRESS LOCATION THAT IS REPRESENTATIVE OF A VALID ENTRY POINT OF A COMMUNICATION ROUTINE

FIELD OF THE INVENTION

The present invention relates to a method of operating an embedded system and to an embedded system, also to a method and apparatus for data communication between a host computer and a target computer system and more particularly but not exclusively between a host computer and an embedded target computer system.

BACKGROUND OF THE INVENTION

During development and testing of an embedded computer system, especially an embedded microprocessor-based computer system, it is normally necessary to connect the system to a host computer so that an engineer can debug the embedded system. Debugging software on the host computer provides access by the engineer into the embedded system. Typically, the engineer uses the host computer and debugging software to set break points which stop threads of execution on the target embedded system, monitor registers in the target, monitor memory states and monitor input and output data. The engineer may also restart threads that have been previously stopped and perform a variety of other tasks including rebooting the target computer using the host.

Although in normal operation the embedded system may be virtually self-sufficient in that it does not in normal use need to perform input/output, it may be necessary during debugging for such input/output to be performed. Examples of this are displaying messages at the host, reading characters from the host keyboard or reading data from a file stored on the host.

Similar situations requiring input/output may occur where an embedded system is sold to an end user and the end user needs to customize the embedded system, for example writing information into programmable read only memory in the embedded system.

Embedded systems may contain more than one application, for instance stored in a read only memory or downloaded over a link, at run-time. An example of the latter is a satellite transmission link. Each such application may need to perform input output of data to the host computer during debugging. Furthermore, applications may be interconnected so that one application that is executing may, at a virtually arbitrary point in time, cause another application to start executing. Although it is possible to provide input/output libraries during the construction of each application, such libraries, and as a result the protocol implemented by the application for input/output, may differ between applications.

As a result, debug tools on the host may have difficulties in communicating with target applications which have different versions of input/output libraries, and it may be impossible for communication to occur. Typically, applications built with input/output libraries which differ in vintage from the debug tools resident on the host will not be able to perform input/output with the host; this may result in the target "hanging", waiting for an input from the host in response to a message from the target, which message has not been recognised by the host.

The Open System Interconnect (OSI) seven-layer model provides a commonly-used guideline for developing standards for communication interchange. The model envisages seven layers for controlling communication ranging from the deepest level, the application layer at level 7 through the data link layer at level 2 and the physical layer at level 1. Generally speaking, use of the OSI model envisages that information will have an additional header added to it upon each transition from a deeper level to the next less-deep level until the information is provided on the physical link. Then, upon reception, the headers will be successively removed until the information is again at the application level. Where the data-link layer (level 2) of the host-target communication protocol is implemented by the reading from and writing to of volatile memory in the address space of the target—the target lacking specific hardware to implement the input output protocol at this level—the problem identified above is further compounded.

Typically, each application may be built individually, with a linker dynamically determining the addressable locations used for protocol implementation. If there is more than one application needing to perform input/output, the host will not be able to determine easily which memory locations should be used at a particular point in time. It would of course be possible to arrange a system which reserved locations in memory for protocol use but this requires application developer intervention regarding the input/output implementation.

As used herein, the term 'digital signal processor' includes microprocessors in general and other like digitally operating processing devices.

It is accordingly a primary object of the present invention to at least partially overcome the difficulties of the prior art.

SUMMARY OF THE INVENTION

According to a first aspect of the present invention there is provided a method of operating an embedded system comprising a digital signal processor and associated memory, said embedded system having an application program for running on said digital signal processor and a link external to said embedded system, said link being capable of connection to a host computer, said memory comprising a pointer location for storing pointer information representative of the location of the entry point of a computer file comprising a communication subroutine, the method comprising: running said application program, whereby said application program identifies a need for communication over said link; establishing the contents of said pointer location to determine whether said pointer location contents represent a valid address in said memory; if said contents of said pointer location are established as representing a valid address in said memory, calling said valid address; determining whether code at said valid address indicates a said entry point, thereby determining whether a said computer file is present; if said computer file is present, running said subroutine to thereby communicate.

According to a second aspect of the present invention there is provided a method of data communication between a host computer and a target computer system, wherein said target computer system has a memory comprising plural addressable locations and is adapted to run an application, the method comprising: providing a file comprising a subroutine enabling said communication between said computers; dynamically loading said file from said host computer to said memory of said target computer system whereby said file has an entry point at a dynamically-determined addressable location; storing at a predetermined one of said addressable locations data representative of the address of said entry point; running said application, whereby said application determines said data representative of said address thereby accessing said subroutine; and running said subroutine whereby said communication occurs.

According to a third aspect of the present invention there is provided an embedded system comprising a digital signal processor and associated memory, said embedded system having an application program for running on said digital signal processor and further having a link external to said embedded system, said link being capable of connection to a host computer, said memory comprising a pointer location for storing pointer information representative of the location of the entry point of a computer file comprising a communication subroutine, the system comprising:

processor circuitry for running said application program, whereby said application program identifies a need for communication over said link;

establishing circuitry for establishing the contents of said pointer location to determine whether said pointer location contents represent a valid address in said memory;

calling circuitry for calling said valid address;

determining circuitry for determining whether code at said valid address indicates a said entry point, whereby said processor circuitry runs said subroutine.

According to a further aspect of the present invention there is provided a device for debugging an embedded computer system, said embedded system having a memory comprising plural addressable locations, said computer system being adapted to run an application, the device comprising a host computer connected to said embedded computer system, said host computer comprising a computer file including a subroutine enabling data communication between said embedded computer system and said host computer;

said host computer comprising a linker-loader connected to said link and operative to dynamically load said file to said memory of said embedded computer system whereby said file has an entry point at one of said addressable locations, said linker-loader comprising means for storing at a predetermined one of said addressable locations data representative of the address of said entry point;

said embedded computer system comprising processor means running said application whereby said application determines said data representative of said address, thereby accessing said file whereby said communication occurs between said embedded computer system and said host computer.

BRIEF DESCRIPTION OF THE DRAWINGS

A preferred but non-limiting embodiment of the invention will now be described with reference to the accompanying drawings in which.

DESCRIPTION OF THE PREFERRED EMBODIMENT

Figure 1:
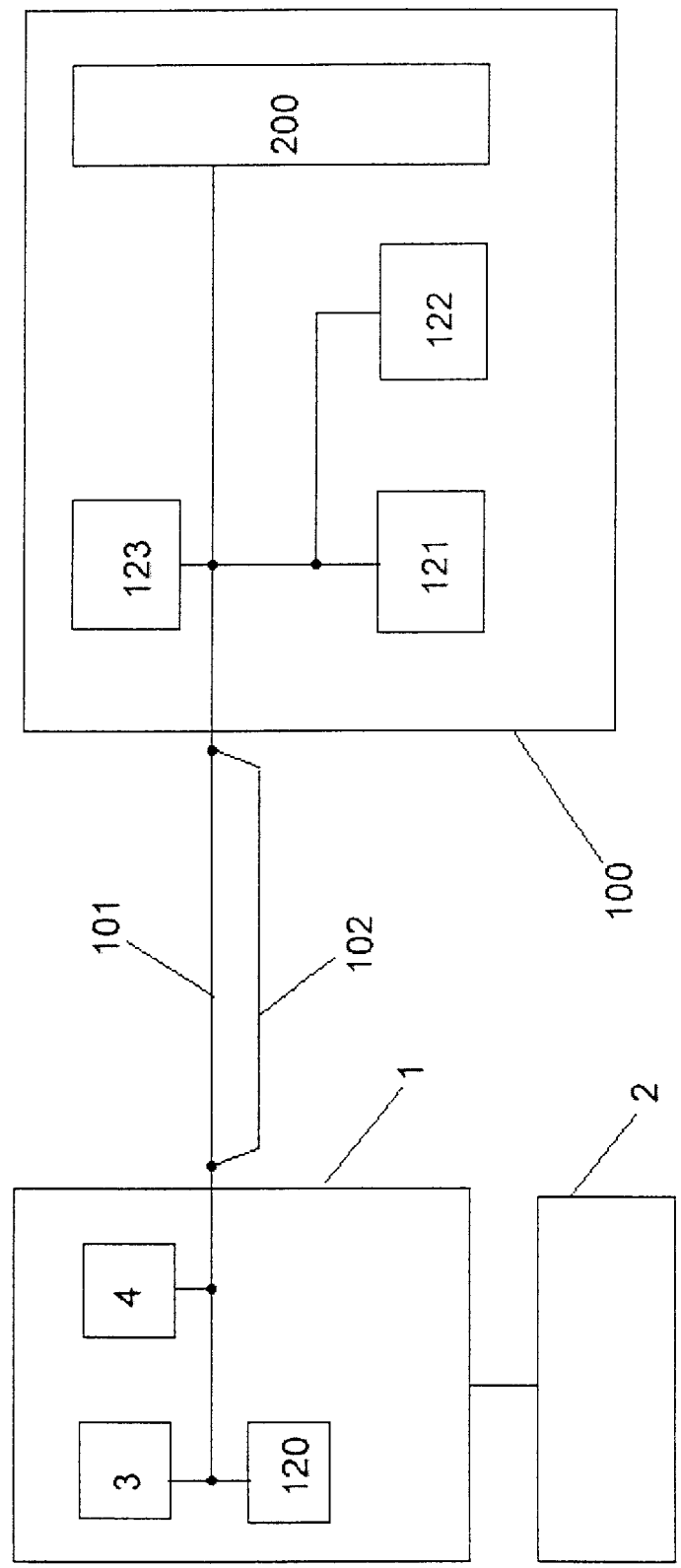
FIG. 1 shows a block diagram of a host computer connected to a target computer for downloading an input/output library.

In the various figures like reference numerals refer to like parts.

Referring first to FIG. 1, a host computer 1 includes an input device such as a keyboard 2 and runs debugging software 4 for a target embedded system 100, the host and target being connected via a communications link 101, 102. This link is shown figuratively in FIG. 1 as two separate paths with a first path 101 conveying data from the host machine 1 to the target machine 100 and a second path 102 connecting to the target computer 100 to the host computer 1. It will be understood that the link may be of any conventional type that allows two-way communication. Such communication need not be simultaneous. The target system typically includes a microprocessor or other processing circuitry, hereinafter referred to as a digital signal processor.

The host computer further includes a file 3, hereinafter referred to as a library, containing a collection of subroutines and information that will be used by the target computer to implement a multi-layered communication protocol over the physical link 101, 102.

The link 101 outgoing from the host computer 1 to the target computer 100 is shown figuratively as connected to four portions of the target system, namely a first application 121, a second application 122, a block 123 whereby the embedded digital signal processor of the target system 100 may be reset, and to the volatile memory 200 of the target system.

It will be understood by those skilled in the art that the debugging software 4 may communicate over the link 101 to interrogate or monitor the registers in the target, the memory in the target, to stop and restart threads of execution.

The applications 121, 122 may be stored in read only memory or may be downloaded via a separate link (not shown) at run-time, eg into RAM 200.

Figure 2:
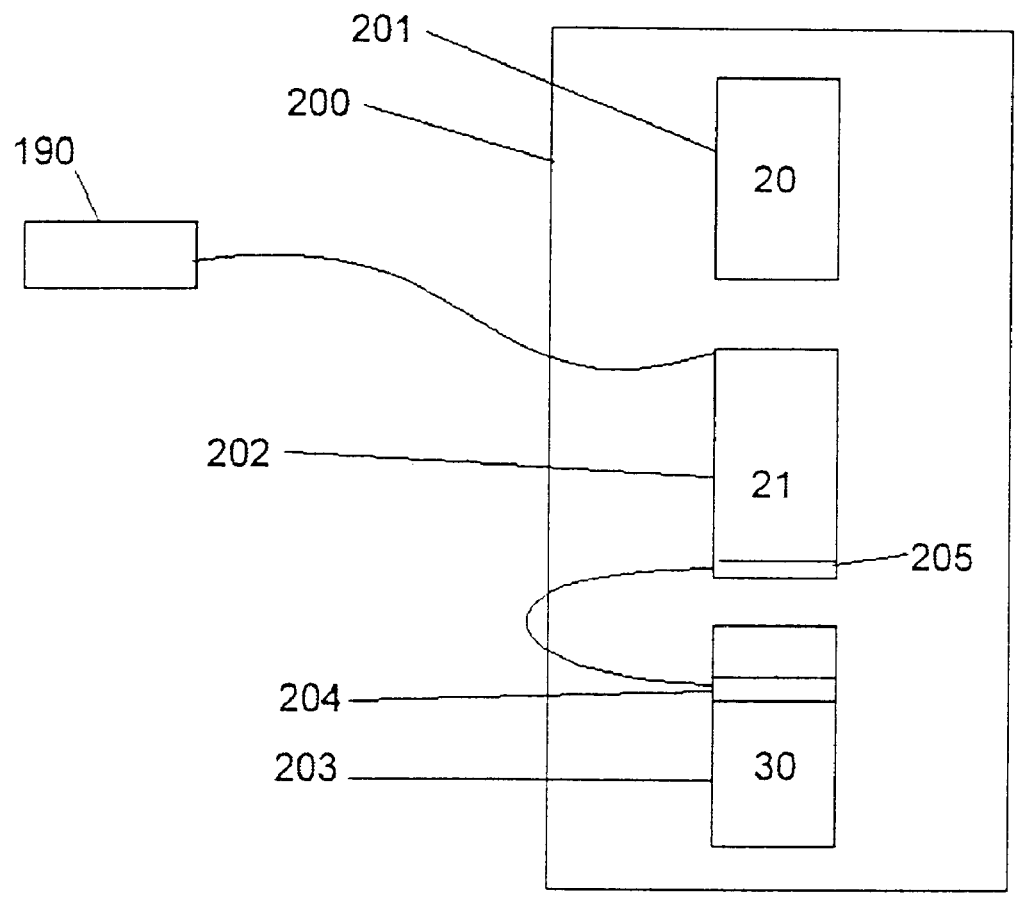
FIG. 2 shows a schematic partial view of the target system showing the use of a pointer to indirectly access an entry point of a dynamically loaded library.

Referring to FIG. 2, the target system 100 includes an exception handler 20 loaded into a memory area 201, the exception handler 20 having a stack 21 in a reserved area of memory 202 the stack including a reserved location 205. In the embodiment described, which has a negative-growing stack, the reserved location 205 is selected as the bottom of the stack. The host system 1 may dynamically load the exception handler stack into the target memory. The target includes a hard-wired location 190 accessible to both the target and the host, hereinafter referred to as a vector.

As used in this document, a vector is a reserved area, typically at a hard-wired location, used to contain address data of a key system entity. A pointer is a general holder of the address of a selected (arbitrary) entity.

At the start of debugging, the library 3 is accessed by the linker-loader 120 of the host which dynamically loads the library to a suitable vacant area of memory 203 of the target according to the usage of memory by applications, data and functions, to provide a loaded library 30 having an entry point 204 within the region of memory 203. At the time of loading the library 30 into memory, the linker-loader 120 determines where in the memory of the target to load the stack. The linker-loader stores at the bottom stack location 205, hereinafter referred to as the entry point pointer, information representing the entry point 204 and loads the location of the stack into the vector 190. It will be understood by those skilled in the art that the information stored by the vector 190 may be of various forms, including the absolute address of the exception handler stack 202 or other information such as an offset.

If the embedded system 100 is not connected to a host, no library will have been loaded and entry point pointer 205 is set to contain a predetermined value indicative of the fact that no library is available, as will be described below. This predetermined value may be a value that is not a valid address.

When an application performs input/output, the following events take place:

1. The application identifies the need to perform input/output, and calls a linked-in function setting up input/output data structures at the upper levels of the protocol.
2. The linked-in function looks for a valid address at location 205 by reading the contents of vector 190 to find the exception handler stack and offsetting to the entry point pointer 205. If the entry point vector 205 does not store a valid address but instead the "no library available" value, then the host is assumed to be disconnected. An appropriate error code is then produced.
3. If the address is valid, it is assumed to be that of the library entry point. A call is made to that entry point and the code at this address will determine whether the host is connected and whether input/output is enabled. The method of checking the library code is described later herein. If the code checks indicate either that no host is connected, or that input/output is not enabled, an appropriate error code will be determined stating the reason for input/output failure.
4. If the host is connected and input/output is enabled, the application will communicate with the debugger to carry out the input output operation and return an appropriate status code.

Figure 3:
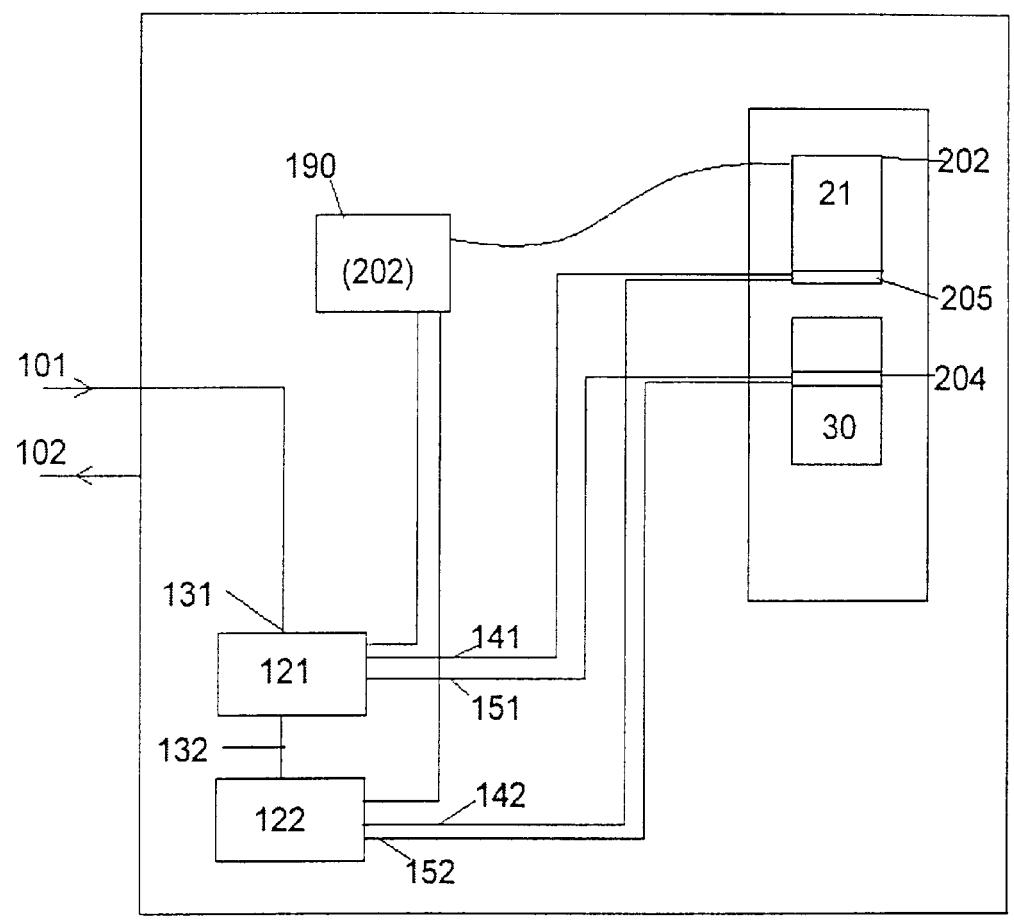
FIG. 3 shows a block diagram of a target computer showing how data communication is effected using the invention.

Referring now to FIG. 3, the first application 121 may be initiated by the host computer 1 at an input 131. If the first application 121 needs to input data from the host computer 1 then it must make use of the dynamic library 30. To do this, application 121 reads the vector 190 and from its contents accesses the address of the exception handler stack 202, offsets to the entry point pointer 205 which results in the entry point into the dynamic link library 30 being supplied to the application at input 141. The application fetches information from the dynamic link library 30 at terminal 151. The application 121 is thus able, by use of the required subroutines in the library 30 to "translate" information coming in over link 101 from the host computer.

If the first application needs to output information to the host computer, then a similar process applies.

Further inspection of FIG. 3 shows that the first application 121 is capable of starting the second application 122 over a path 132. If during execution of the second application 122 there is a requirement for the second application to input or output data from or to the host computer 1, the second application uses the vector 190 to load the entry point data from memory location 205 over the path 142 and accesses the library 30 over the path 152.

This in turn enables the second application 122 to input or output data as required.

Each of the applications typically comprises a start up code. The system described uses a single region of memory 202 for the exception handler stack 21. However, where more than one application exists in the embedded system, each may use a different region of memory for the stack of its exception handler. If this occurs, then when a host is connected, a region of memory known to the host must be reserved for this stack and the vector of the target updated to point to this region. The consequence is that all applications use a single area of stack for the particular exception. This ensures that the host has a single stack area, which it will use for the linker-loader 120 to store the address information of the library 30.

Without these measures being taken, each of the stack regions will be valid for a particular time period and the host will be unable to determine which of these stack regions to write the relevant data to at any one time.

There are three ways in which an application may start. In the first, the host starts the application, in the second the application is started by the target following reset, eg power-up, and in the third, the application is started by another application, referred to here as the initiating application.

For the first, use of the dynamic link library is necessary.

For the second, the application should run correctly without recourse to the library, and if the application tries to call the library, an error should be indicated.

However, for the third, the provision of the dynamic link library depends on how the initiating application was started. If the initiating application was started by the host, then the dynamic link library should be made available: if the initiating application started after target reset, then no library should be needed. (It will of course be understood by those skilled in the art that a whole chain of applications may exist, in which case the decision depends on how the first in the chain started up)

To cope with the above situation, the embodiment initialises the contents of the entry point pointer 205 according to the following rules:

If the host has started the application, the application start up code assumes that the entry point pointer value is valid—i.e. the host has set the value stored by the entry point pointer 205 to point to a dynamic library, which the host has downloaded to the target.

If the application has been started following reset of the target, the application start up code will place the above-discussed "no library available" value in entry point pointer 205 indicating that there is no available dynamic library.

If the application has been started by an initialising application then:

a) If the host started the initialising application, then the value stored by entry point pointer 205 is considered valid and it is considered that there is a valid library in the system.

b) If however there is no host connected, or if the host did not start the initialising application, then it is necessary to reset the contents of 205 to the "no library available" special value.

To implement these rules, the target digital signal processor supports a mechanism whereby the host can set a single bit of state in a register of the target, which is initialised upon an input to reset logic 123, i.e., a processor reset. This bit is hereinafter referred to as the "host-connected bit" and typically resides in a processor register or a memory-mapped register.

As noted above, two system start-up situations exist:

1. Ordinary, where the target executes a reset sequence, such as power up, and starts executing code at an address fixed, for example by contents of ROM within the embedded digital signal processor.
2. Via the host, in which case the host controls the reset sequence and may also control the address of the first code to be executed.

If the digital signal processor is reset using the ordinary sequence, the host-connected bit is initialised by the digital signal processor reset-logic. The start up code of the first application to be executed reads the host-connected bit, and because it is initialised determines that the host is regarded as not connected. The code then sets the contents of memory location 205 to the no-library value.

If however the host starts the target, then:

1. The host resets the target and holds it in a suspended state.
2. The host downloads the exception handler stack and adjusts the vector to point to this stack.
3. The host downloads the input/output library to the target and sets the entry point pointer 205 in the stack to contain the entry-point to this library.
4. The host inverts the host-connected bit.
5. The host releases the target from its suspended state.

Note that the order may differ from the above. For example, the library may be dynamically loaded, whereby the host determines its entry point, and then the stack—containing the entry point pointer set to the entry point—may be dynamically loaded.

In any event, the start up code of the first application then executes, reads the host-connected bit (which has been inverted) and decides that a host is connected. As a result, it is assumed that the host has loaded a library, and correctly set the entry point pointer. Thus the entry point pointer 205 is left unchanged.

The dynamically loaded subroutine is called with two machine-word sized parameters. It returns a machine-word sized value. The first parameter is a value that represents an operation to perform, the second a parameter for that operation. Certain operations do not use the second parameter. Similarly, it is not necessary for an operation to utilise the return value. The application will have been provided at the time of writing, with the values representing the operations anticipated as necessary.

These values are then used in calling the relevant subroutine from the library.

Alternatively, the library may include a routine translating the values from the application into different values corresponding to those needed by the library.

One such operation will determine whether the host is connected. This operation will be used by the application by calling the input/output library subroutine with the first parameter containing a reserved value, which represents 'host connected operation'. The second parameter is not used by this operation so an arbitrary value may be passed. The subroutine will determine whether the host is connected with an internal action and return one of two possible values, which are 'host-connected' and 'host not connected'.

Similar operations are used to send and receive data from the host, and to specify callback functions in the application to be used by the input/output subroutine in special circumstances.

The two-parameter model provides very good backward compatibility to legacy applications, which cannot be changed. For instance, a later dynamic library may provide additional features. Each additional feature may be accessed by using a value of the first parameter that was not available in earlier libraries. Features that were present in older libraries are provided in the newer libraries and each of these will be accessed with the same value for the first parameter in both old and new libraries. The second parameter remains a 'feature-specific' parameter.

Having provided a mechanism for loading a dynamic library onto a remote system, the same approach is useable to satisfy a wide range of run-time requirements, including but not limited to input/output. An example of such a requirement is the need to provide a work round to a hardware bug that becomes manifest during a debug session. Such bugs may only be present on a particular version or revision of the silicon. Once the problem is discovered, a routine may be written that contains a feature that may be called by the application when appropriate to prevent the bug from occurring, or to mask the bug. This routine may be incorporated within a library on the host, and loaded dynamically into the target at the start of a debug session. Components that do not possess the bug will not require the routine and may be provided with a version of the library that does not have the bug work-round feature. Such a version provides a subset of library functionality such as input/output capability.

Figure 4:
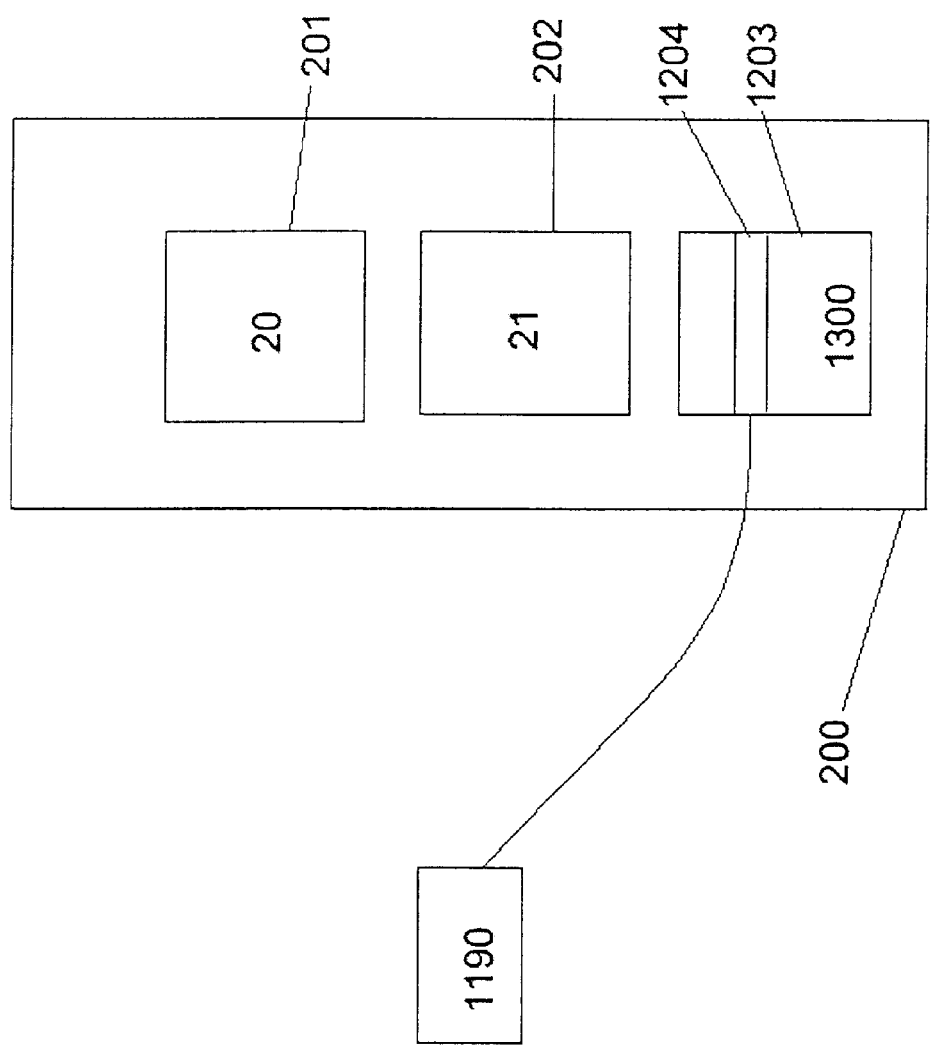
FIG. 4 shows a schematic partial view of the target system showing an alternative way of accessing an entry point of a dynamically loaded library.

In an alternative embodiment shown in FIG. 4, a processor register 1190, which is large enough to contain a pointer, is reserved for use by the input/output system. The digital signal processor vector to an exception handler stack and the pointer at a reserved position of the exception handler stack are not necessary. The register is initialised by the application startup code to contain the "no library available" value if the host is not connected. If the host is connected, the host places a value in this register pointing to the entry point 1204 of IO dynamic library 1300, which the host has loaded onto the target.

When the application wishes to perform input/output, it looks at the value in the reserved register 1190. If this value is not the special 'no library available' value, it is assumed to be the address of the entry point 1204 to the input/output subroutine. The application calls the subroutine at this address to carry out input/output.

What is claimed is:

1. A method of operating an embedded system comprising a digital signal processor and associated memory, said embedded system having an application program for running on said digital signal processor and a link external to said embedded system, said link being capable of connection to a host computer, said memory comprising a pointer location for storing pointer information representative of the location of the entry point of a computer file comprising a communication subroutine, the method comprising:

running said application program, whereby said application program identifies a need for communication over the link;

establishing the contents of said pointer location to determine whether said pointer location contents represent a valid address in said memory;

if said contents of said pointer location are established as representing a valid address in said memory, calling said valid address;

determining whether code at said valid address indicates a said entry point, thereby determining whether a said computer file is present;

if said computer file is present, running said subroutine to thereby communicate.

2. The method of claim 1, wherein said establishing step comprises reading the content of a vector of said digital signal processor as address information representative of said pointer location.

3. The method of claim 1, further comprising, when said contents of said code does not indicate a said entry point, providing an error code indicating that communication is not possible.

4. The method of claim 1, further comprising storing, at said pointer location, a predetermined value when said host is not connected to said link, and wherein said establishing step further comprises, if said pointer location does not represent a said valid address, establishing whether said location stores said predetermined value; and if so, providing a error code indicating that said host is not connected.

5. The method of claim 1, further comprising:

writing a first value or second to a register of said digital signal processor;

wherein said running step comprises:

determining the contents of said register and if said contents of said register correspond to said first value, writing to said pointer location, a predetermined value when said host is not connected to said link, and wherein said establishing step further comprises, if said pointer location does not represent a said valid address, establishing whether said location stores said predetermined value; and if so, providing an error code indicating that said host is not connected.

6. The method of claim 5 wherein if said contents of said register correspond to said second value, said pointer location is left unchanged, for evaluation by said establishing step.

7. The method of claim 6 further comprising:

causing said digital signal processor to execute a reset sequence to thereby start executing code at an address determined by said embedded system, and writing said first value to said register.

8. The method as claimed in claim 6, further comprising:

connecting a host to said link; and starting said embedded system from said host, wherein said starting step comprises writing said second value to said register.

9. The method of claim 8, wherein said embedded system comprises a further application program capable of being started by said application program, the method comprising:

running said application program whereby said second application is started; and sensing that said contents of said second register correspond to said second value.

10. A method of data communication between a host computer and a target computer system, wherein said target computer system has a memory comprising plural addressable locations and is adapted to run an application, the method comprising:

providing a file, comprising a subroutine enabling said communication between said computers;

dynamically loading said file from said host computer to said memory of said target computer system, whereby said file has an entry point at a dynamically-determined addressable location;

storing at a predetermined one of said addressable locations data representative of the address of said entry point;

running said application, whereby said application determines said data representative of said address thereby accessing said subroutine; and running said subroutine whereby said communication occurs.

11. An embedded system comprising a digital signal processor and associated memory, said embedded system having an application program for running on said digital signal processor, the application program needing to communicate over a link external to said embedded system, said link being capable of connection to a host computer, said memory comprising a pointer location storing pointer information representative of the location of the entry point of a computer file comprising a communication subroutine, the embedded system comprising:

processor circuitry for running said application program, whereby said application program identifies the need for said communication;

establishing circuitry for establishing the contents of said pointer location to determine whether said pointer location contents represent a valid address in said memory;

calling circuitry for calling said valid address;

determining circuitry for determining whether code at said valid address indicates a said entry point, whereby said processor circuitry runs said subroutine.

12. The system of claim 11 wherein said digital signal processor has a vector, and wherein said establishing circuitry comprises reading circuitry for reading the content of said vector of as address information representative of said pointer location.

13. The system of claim 11 comprising error circuitry providing an error code indicating that communication is not possible, when said contents of said code does not indicate a said entry point.

14. The system of any of claim 13, further comprising storing circuitry for storing, at said pointer location, a predetermined value when said host is not connected to said link, and wherein said establishing circuitry is operable to establish whether said location stores said predetermined value, if said pointer location does not represent a said valid address; and wherein said error circuitry is operable to provide an error code indicating that said host is not connected, if said pointer location does not represent a said valid address.

15. The system of claim 14 wherein said processor circuitry is operable to leave the contents of said pointer location unchanged if said contents of said register correspond to said second value.

16. The system of claim 15 further comprising:

reset logic for causing said digital signal processor to execute a reset sequence whereby said digital signal processor starts executing code at an address determined by said embedded system, and whereby said processor circuitry controls said write circuitry to write said first value to said register.

17. The system of claim 15 in combination with a host computer connected to said link; wherein said host computer has start circuitry for starting said embedded system from said host, wherein said start circuitry controls said writing circuitry to write said second value to said register.

18. The system of claim 11 further comprising:

writing circuitry for selectively writing a first value or second to a register of said digital signal processor;

wherein said processor circuitry is operable to:

determine the contents of said register and if said contents of said register correspond to said first value, cause said writing circuitry to write to said pointer location a predetermined value; and wherein said establishing circuitry is operable to establish whether said location stores said predetermined value; and wherein said error circuitry is operable to provide an error code indicating that said host is not connected, if said pointer location stores said predetermined value.

19. A device for debugging an embedded computer system, said embedded system having a memory comprising plural addressable locations, said computer system being adapted to run an application, the device comprising a host computer connected to said embedded computer system, said host computer comprising a computer file including a subroutine enabling said data communication between said embedded computer system and said host computer;

said host computer comprising a linker-loader connected to said link and operative to send said file and dynamically load said file to said memory of said embedded computer system whereby said file has an entry point at one of said addressable locations, said linker-loader comprising means for storing at a predetermined one of said addressable locations data representative of the address of said entry point;

said embedded computer system comprising processor means running said application whereby said application determines said data representative of said address, thereby accessing said file whereby said communication occurs.

20. The method device of claim 19 wherein said predetermined one of said addressable locations is a predetermined address in the stack of an exception handler.

* * * * *